Dec. 29, 1931. R. H. SCHWARTZ 1,838,158
WINDOW CLEANER
Filed March 22, 1930
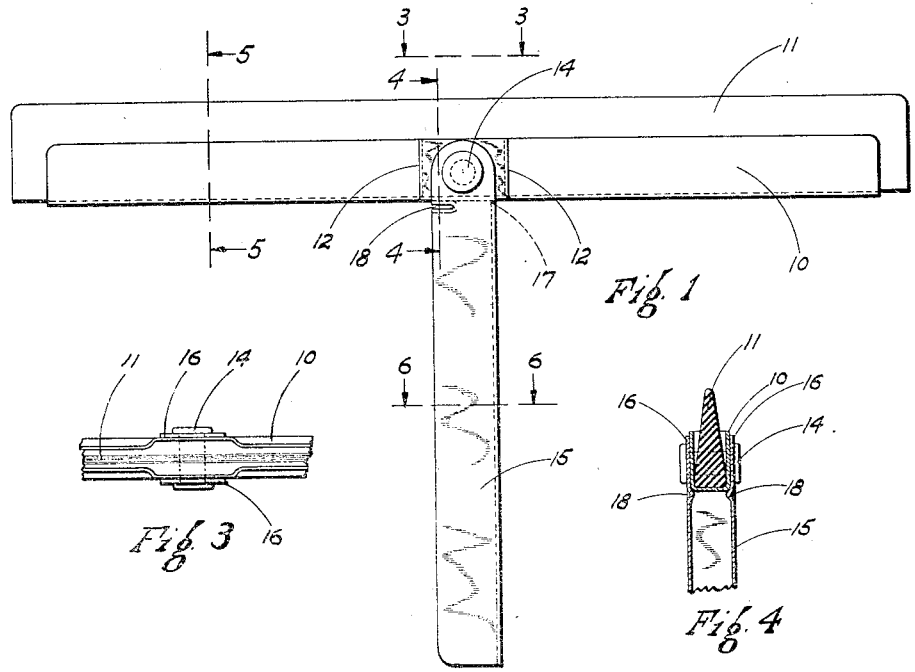
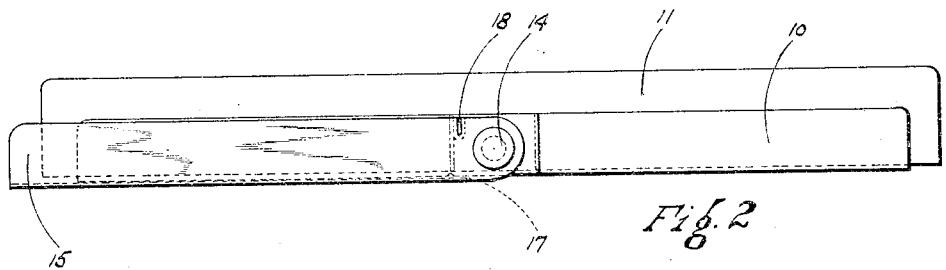
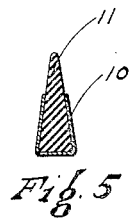 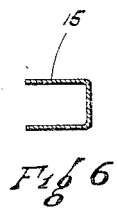
Inventor
Roy H. Schwartz.
By Ricky & Watts
Attorney Patented Dec. 29, 1931

1,838,158

UNITED STATES PATENT OFFICE

ROY H. SCHWARTZ, OF CLEVELAND, OHIO

WINDOW CLEANER

Application filed March 22, 1930. Serial No. 438,105.

This invention relates to wipers or squeegees and is specifically adapted for use by service station attendants for cleaning the windshields of the automobiles of patrons who drive in for gasoline, oil or other servicing.

One of the objects of this invention is to provide a wiper or squeegee which may be handily carried around in the pocket of a garment or the side pocket of an automobile.

Another object is to provide a wiper which is so economic of manufacture that it can be used as a give away article for advertising purposes.

Another object is to provide a wiper which is durable and efficient in use.

Other objects and advantages of the improved windshield cleaner will appear as the description proceeds.

Referring now to the drawings:

Fig. 1 is a plan view of the invention ready for use.

Fig. 2 is a similar view with the handle folded for convenient carrying; and

Figs. 3, 4, 5, and 6 are views, respectively on the lines 3—3, 4—4, 5—5 and 6—6 of Fig. 1, all taken in the directions indicated by the arrows.

Referring now more in detail to the drawings the body of the wiper is composed of a channel member 10 for holding the wiping element 11. This wiping element is preferably of wedge-shaped cross-section as clearly shown in Figs. 4 and 5 and is preferably made of rubber or similar material. By making the wiper element of wedge shaped cross-section, a flexible wiping edge is obtained to effectively wipe the parts being cleaned and a thickened base portion is obtained which prevents early breaking or tearing of the wiper element along a line defined by the edges of the channel holding the wiper element, as is the case in the ordinary construction of wiper.

The sides of the channel member 10 are bent toward each other, as shown in Fig. 5, to firmly grasp and hold the wiper element 11 from points 12 near the center of the channel to the ends thereof, the central portion of the channel being left with the sides thereof substantially parallel, as shown in Figs. 3 and 4. To this portion of the channel is pivotally attached by means of a rivet, or other suitable securing means 14 the channel shaped handle 15. The upper end of the handle is forked as at 16 to receive the channel member 10 therebetween. The bottom of the channel, adjacent the forked end, at its end edge 17, acts as a stop to limit the pivotal movement of the handle 15, when the same is being opened, by engaging the bottom of the wiper retaining channel 10, This edge 17 is so located as to stop the handle when it reaches a position substantially perpendicular to the body of the wiper.

When not in use the channel shaped handle 15 is folded on to the body of the wiper as shown in Fig. 2 and can be conveniently carried in a pocket of a garment and can be quickly reached when it is desired to use the same.

In order to hold the handle in its folded position when not in use small depressions 18 are made in the legs of the channeled handle near the top thereof for engagement with the parallel sides 16 of the center of the channel 10. It will be evident that this engagement of the depressions 18 against the sides 16 will act as an efficient means for holding the handle in folded position by virtue of the inherent spring action that will be in the opposink sides of the channeled handle 15 and by virtue of the rivet holding the sides thereof against the sides of the central portion of the channel 10.

It will thus be seen that a wiping and cleaning device has been provided that is not only durable and convenient for carrying in a pocket of a garment or side pocket of an automobile but one which is simple in construction and economic of manufacture. Although a preferred embodiment of the invention has been described it is to be understood that variations and modifications may be resorted to which fall within the scope of the appended claims.

Having thus described the invention what is claimed and desired to be secured by letters patent is:

1. A squeegee of the class described having a wiping element of wedge-shaped cross-section, a channel, the ends of which have converging sides for holding said wiping element and the central portion of which has substantially parallel sides, a channeled handle pivotally attached to the central portion of said channel, means for holding a part of the body of the wiper within said channeled handle, and means for limiting the pivotal movement of the handle, when being rotated to open position.

2. A squeegee of the class described having a wiping element of wedge-shaped cross-section, a channel, the ends of which have converging sides for holding said wiping element and the central portion of which has substantially parallel sides a channeled handle pivotally attached to the central portion of said channel, depressions on the upper end of said handle for engaging the central portion of said first named channel member and holding the parts in folded position and means for limiting the pivotal movement of the handle, when being rotated to open position.

3. A squeegee of the class described having a wiping element of wedge shaped cross section, a channel, means for securing said wiping element within said channel, a channeled handle pivotally attached to the central portion of said channel, means for holding a part of the body of the wiper within said channeled handle and means for limiting the pivotal movement of the handle, when being rotated to open position.

4. A squeegee of the class described comprising a channel, a wiping element secured in said channel, a channeled handle pivotally attached to the central portion of said channel, depressions on the upper end of said handle for engaging the central portion of said first named channel member and holding the parts in folded position and means for limiting the pivotal movement of the handle when being rotated to open position.

5. A squeegee of the class described having a wiping element, a channel, the ends of which have converging sides for holding said wiping element and the central portion of which has substantially parallel sides, a channeled handle pivotally attached to the central portion of said channel, means for holding a part of the body of the wiper within said channeled handle, and means for limiting the pivotal movement of the handle when being rotated to open position.

In testimony whereof I hereunto affix my signature this 20th day of March, 1930.

ROY H. SCHWARTZ.